(12) United States Patent
Dickey et al.

(10) Patent No.: US 6,857,651 B1
(45) Date of Patent: Feb. 22, 2005

(54) AIRCRAFT GROUND SUPPORT VEHICLE TOW-BAR

(75) Inventors: Daniel Dickey, Lawrenceville, GA (US); Bryan Peters, Snellville, GA (US)

(73) Assignee: Innovative Peening Systems, Inc., Duluth, GA (US)

( * ) Notice: Subject to any disclaimer, the term of this patent is extended or adjusted under 35 U.S.C. 154(b) by 0 days.

(21) Appl. No.: 10/449,220

(22) Filed: May 31, 2003

(51) Int. Cl.[7] ................................................ B60D 1/01
(52) U.S. Cl. ..................... 280/493; 280/491.3; 280/498
(58) Field of Search ................................ 180/904, 444, 180/491.3, 498; 280/408, 489, 493, 494

(56) References Cited

U.S. PATENT DOCUMENTS

| | | | |
|---|---|---|---|
| 1,353,094 A | | 9/1920 | Trumpour |
| 1,451,658 A | | 4/1923 | Hennekin |
| 1,540,502 A | * | 6/1925 | Schneider et al. ..... 280/137.501 |
| 1,543,304 A | | 6/1925 | Tomlinson |
| 2,886,344 A | * | 5/1959 | Beach et al. ................ 280/482 |
| 3,009,713 A | * | 11/1961 | Barker et al. ................ 280/489 |
| 3,193,330 A | * | 7/1965 | Hribar, Jr. .................... 298/8 R |
| 4,116,460 A | | 9/1978 | Drower |
| 4,351,541 A | * | 9/1982 | Propst et al. ................ 280/408 |
| 4,361,342 A | | 11/1982 | Duffield |
| 4,768,803 A | | 9/1988 | Hewitt et al. |
| 4,863,179 A | * | 9/1989 | Isaacs ................... 280/33.996 |
| 5,199,729 A | * | 4/1993 | Sievert et al. ........... 280/47.35 |
| D358,570 S | | 5/1995 | Doherty et al. |
| D369,581 S | | 5/1996 | McCoy et al. |
| 5,524,914 A | * | 6/1996 | Doherty et al. ............... 280/24 |
| 5,685,554 A | * | 11/1997 | Poxleitner ................ 280/491.2 |
| 5,749,589 A | | 5/1998 | Hopkins et al. |
| D397,067 S | | 8/1998 | McCoy et al. |
| 5,873,594 A | | 2/1999 | McCoy et al. |
| 5,873,595 A | * | 2/1999 | Hinte .......................... 280/504 |
| 6,010,142 A | | 1/2000 | McCoy et al. |
| 6,139,043 A | | 10/2000 | Gries et al. |
| 2003/0067142 A1 | * | 4/2003 | Newkirk ..................... 280/489 |

FOREIGN PATENT DOCUMENTS

FR    2 807 991 A1    10/2001

\* cited by examiner

*Primary Examiner*—Daniel G. DePumpo
(74) *Attorney, Agent, or Firm*—Hinkle & O'Bradovich LLC

(57) ABSTRACT

A tow-bar having a skeletonized tongue portion is described. A stopper is typically includes on the bottom portion of the tongue. A head piece having handles internal to the head piece is connected to one end of the tongue. The handles are typically positioned in a triangular arrangement. The end of the tongue, opposite the end including the head piece, includes a hinging portion that can be connected to the respective cart having the tongue. The hinging portion and the head piece include "keyed" ends so that they can connect to the tongue like puzzle pieces. These keyed portions are welded to the tongue. In this way, the pull points are not straight welds but rather keyed and welded portions thereby able to withstand typical abuse.

17 Claims, 3 Drawing Sheets

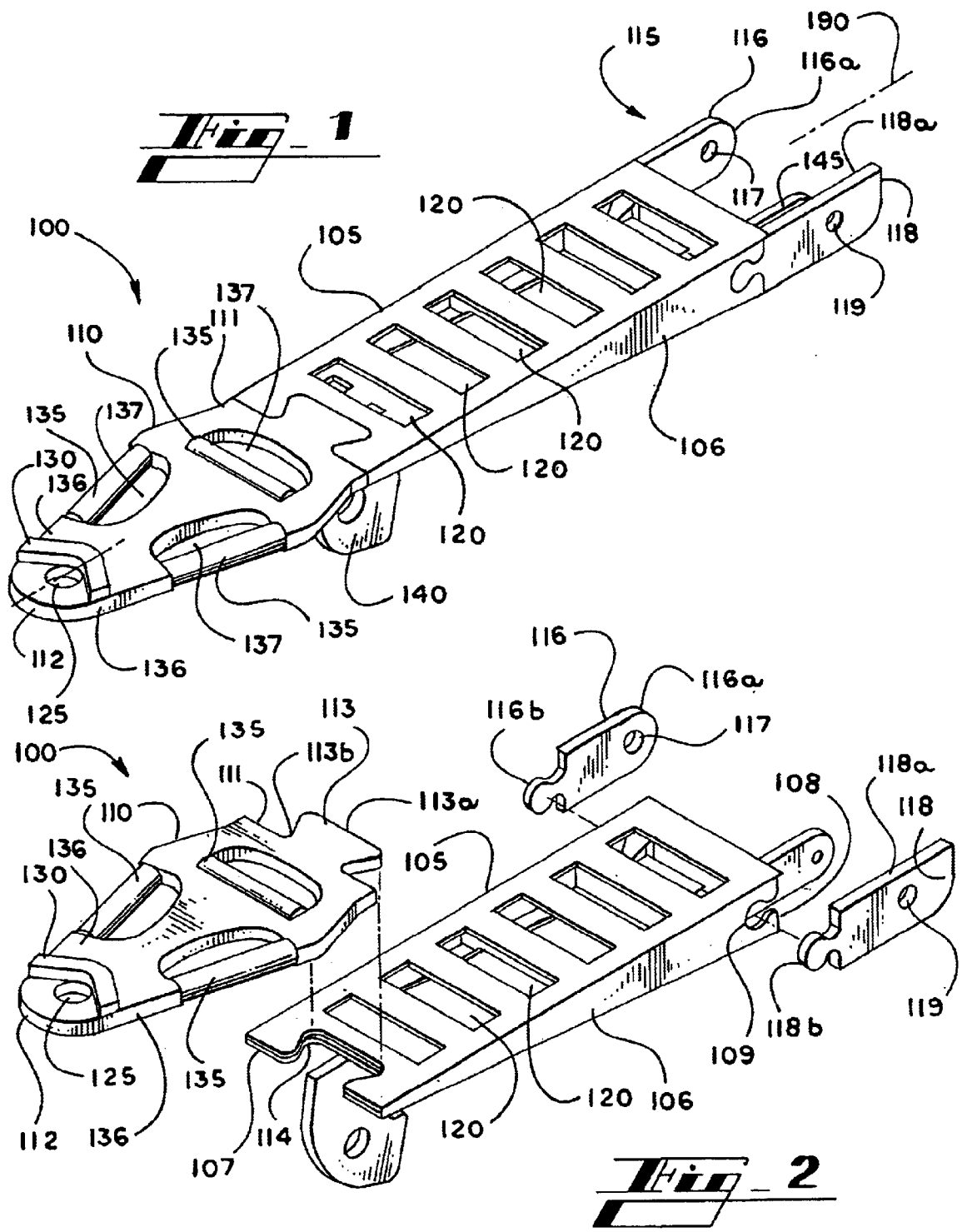

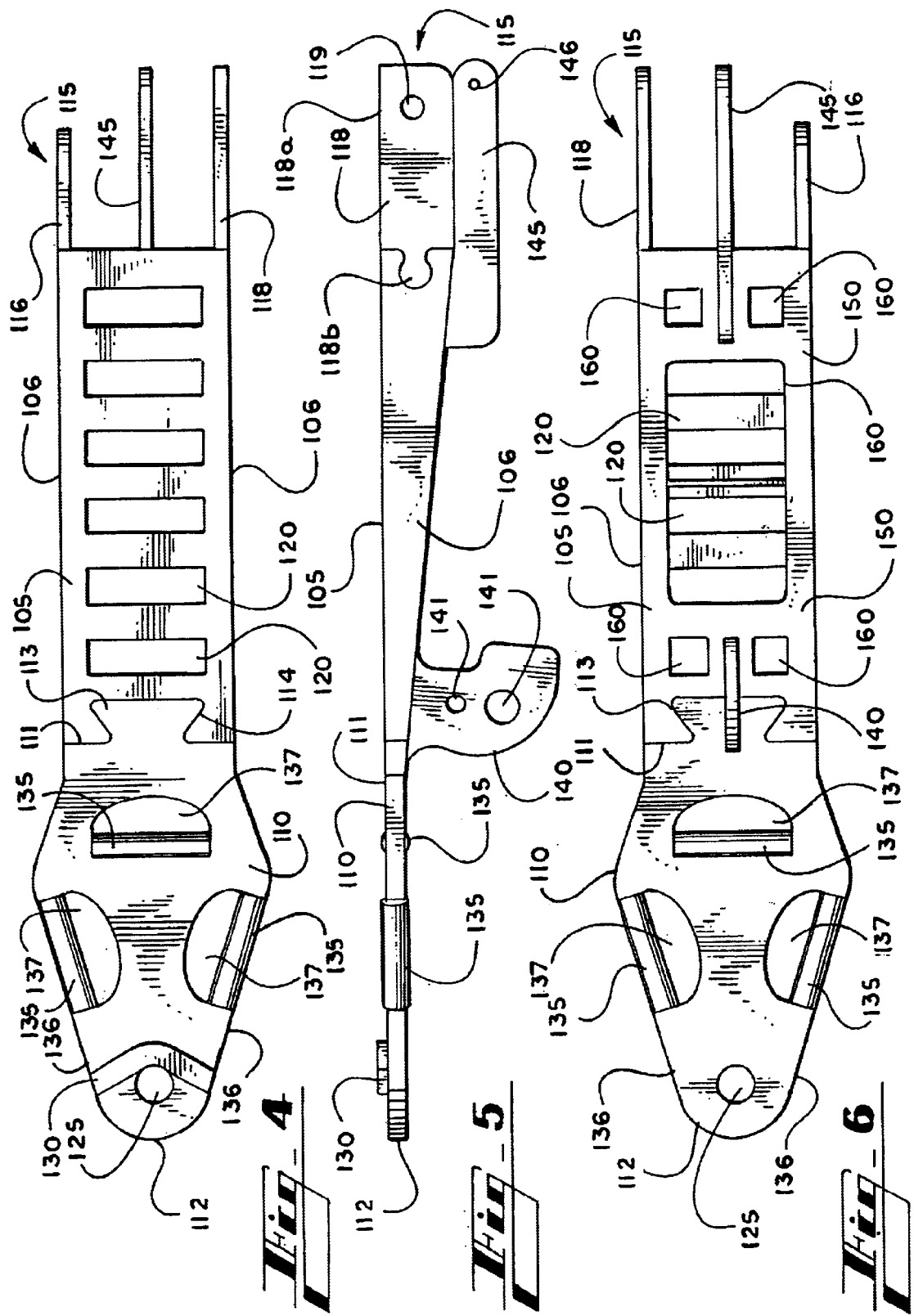

AIRCRAFT GROUND SUPPORT VEHICLE TOW-BAR

BACKGROUND OF THE INVENTION

I. Field of the Invention

The present invention relates generally to the field aircraft ground support vehicles and more particularly to a vehicle tow-bar apparatus and system.

II. Description of the Related Art.

Aircraft ground support vehicles, such as baggage carts, are often pinned together making a long train of carts. The tow-bars connecting the carts typically include an elongated tongue made from a strong metal. A donut hole is typically straight welded to one end of the tongue. Handles are also typically straight welded to the tongue adjacent the donut hole. The donut hole are used to connect to a hitch or pin on the next cart in the train.

Tow-bars need to be manually lifted and connected in order to connect the carts to one another. As such, the donut is constantly attached to pins and is often dropped on the ground. Furthermore, the tongue can often be run over by other vehicles. The weld between the donut and the tongue is thus typically a fatigue point in which the weld can break.

SUMMARY OF THE INVENTION

In general, the invention features a tow-bar having a skeletonized tongue portion. The skeletonization is achieved by creating several elongated channels cut across the tongue. A stopper is typically includes on the bottom portion of the tongue in order to take the brunt of the force if the tongue is dropped on the ground. An improved donut, in the form of a head piece, is connected to one end of the tongue. The head piece includes handles internal to the head piece that prevents the handles from breaking if the tongue is dropped on the ground. The handles are positioned in a triangular arrangement for ease of handling. The end of the tongue, opposite the end including the head piece, includes a hinging portion that can be connected to the respective cart having the tongue. The head piece and hinging portions are not straight-welded to the tongue. Instead, the hinging portion and the head piece include "keyed" ends so that they can connect to the tongue like puzzle pieces. These keyed portions are welded to the tongue. In this way, the pull points are not straight welds but rather keyed and welded portions thereby able to withstand abuse from dropping and being run over.

In general, in one aspect, the invention features a vehicle tow-bar apparatus, including a main body having an underside, a first end, a second end and a longitudinal axis, a head piece connected to the first end of the body and a hinging portion connected to the second end of the body.

In one implementation, the apparatus includes a plurality of elongated channels located in the main body, the channels being generally perpendicular to the longitudinal axis.

In another implementation, the apparatus further includes a skid plate having an arc-shape, connected generally perpendicular to the underside of the body and adjacent the first end and a bar connected to the underside of the body generally parallel to the longitudinal axis and the hinging portion In another implementation, the hinging portion includes a first hinge bar connected to the main body and generally parallel to the longitudinal axis and a second hinge bar connected to the main body and generally parallel to the longitudinal axis and to the first hinge bar, wherein the first and second hinge bars include hinge holes.

In another implementation, the apparatus includes a male protrusion on each of the first and second hinge bars that interconnect with a respective female recess located in tapered side walls of the main body.

In still another implementation, the head piece further comprises abase having a male protrusion that interconnects with a corresponding female recess located in the first end of the main body.

In yet another implementation, the male protrusions on the hinge bars are generally perpendicular with respect to the male protrusion on the head piece.

In another implementation, the apparatus includes a plurality of handles in a generally triangular arrangement, the handles being located within outer edges of the head piece.

In another implementation, one of the plurality of handles is generally perpendicular to the longitudinal axis and at least one of the remaining plurality of handles is angled rearward with respect to the longitudinal axis.

In another aspect, the invention features a vehicle system, including a vehicle, a vehicle tow-bar apparatus connected to the vehicle, the apparatus having a main body having tapered sides, an underside, a first end, a second end and a longitudinal axis, a head piece having a plurality of handles positioned in a generally triangular arrangement within outer edges of the head piece, the head piece being connected to the first end of the body and a hinging portion connected to the second end of the body, wherein the head piece and the hinging portion are keyed to the main body.

In one implementation, the system further includes a skid plate having a generally curved shape and being connected to the underside of the main body.

In another implementation, the main body is skeletonized.

In another implementation, the vehicle tow-bar apparatus is connected to the vehicle through a connection assembly.

In another implementation, the vehicle is an aircraft ground support vehicle.

In still another aspect, the invention features an aircraft ground support tow bar apparatus, including a skeletonized main body having an underside tapered sides, a first end, a second end, a skid plate connected to the underside and a bar connected to the underside and generally parallel to the main body, the bar being adapted to connect to a connection assembly of a vehicle, a head piece keyed to the main body and having an internally arranged plurality of handles and a hinging portion having a first and s second hinge bar, the bars being keyed to and generally parallel to the main body.

In one implementation, the head piece is keyed to the main body through a male protrusion on the head piece being engaged with a female recess located in the first end of the main body.

In another implementation, the hinge bars are keyed to the main body through a male protrusion on each of the hinge bars being engaged with a respective female recess on the tapered sides of the main body.

In another implementation, the tapered sides taper from a narrow point adjacent the first end of the main body to a wide end having female recesses adjacent the second end of the main body.

In another implementation, the apparatus further includes a female recess in the first end of the main body, the recess being oriented generally perpendicular to the female recesses adjacent the second end of the main body.

In still another aspect, the invention features a tow-bar apparatus, including a main body having a first end and a second end and weight-reducing means located along the main body, a head piece connected to the first end having ergonomic means for handling the head piece, a hinging portion connected to the second end and means for connecting the head piece and the hinging portion to the main tongue body.

One advantage of the invention is that the skeletonization allows a sturdy metal to be used to make the tow-bar, and at the same time decreasing the weight of the tow-bar.

Another advantage of the invention is that the triangular arrangement of the handles allows the user to engage the tow-bar in a variety of ways that are natural and ergonomic to the user.

Another advantage of the invention is that it provides a skid plate with a large wear area in order to support and preserve the tow bar.

Another advantage is that the constituent components of the tow bar are keyed together similar to puzzle pieces in order to provide increased support on areas of high tension on the tow bar.

Other objects, advantages and capabilities of the invention will become apparent from the following description taken in conjunction with the accompanying drawings showing the preferred embodiment of the invention.

BRIEF DESCRIPTION OF THE DRAWINGS

FIG. 1 illustrates a perspective view of an embodiment of a vehicle tow-bar,

FIG. 2 illustrates a perspective view of constituent pieces of an embodiment of a vehicle tow-bar;

FIG. 4 illustrates a top view of an embodiment of a vehicle tow-bar;

FIG. 5 illustrates a side view of an embodiment of a vehicle tow-bar; and

FIG. 6 illustrates a bottom view of an embodiment of a vehicle tow-bar.

DETAILED DESCRIPTION

Figure 3:
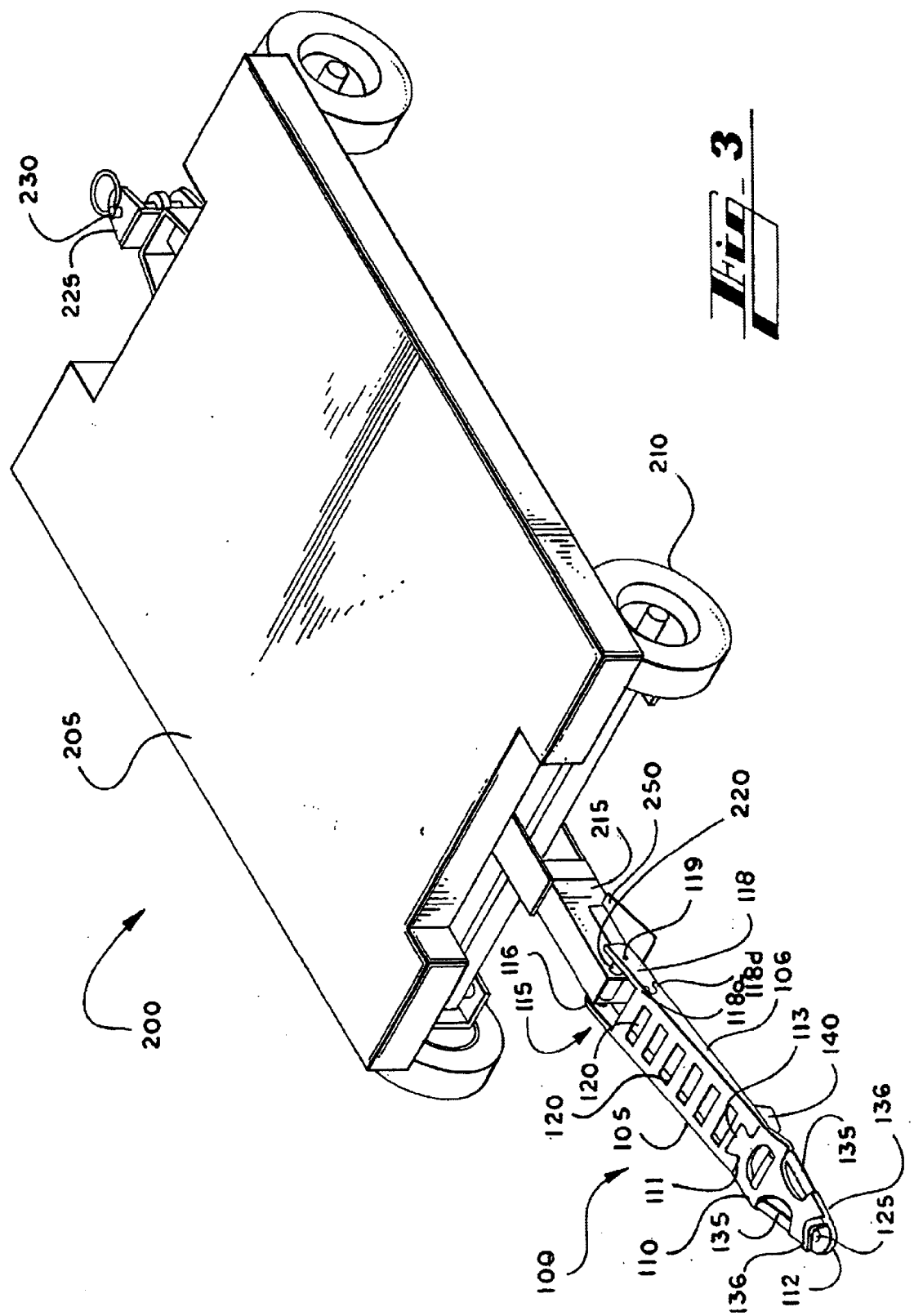
FIG. 3 illustrates a perspective view of a cart having an embodiment of a vehicle tow-bar.

Referring to the drawings wherein like reference numerals designate corresponding parts throughout the several figures, reference is made first to FIG. 1 that illustrates a perspective view of an embodiment of a vehicle tow-bar 100 having a longitudinal axis 190. The tow-bar 100 typically includes a main tongue body ("body") 105, a head piece 110 and a hinging portion 115.

The body 105 typically includes tapered sides 106. The sides 106 taper from the smallest point of the body 105 to the widest point at the end of the body 105. The body 105 also typically includes a series of elongated channels 120 cut into the body 105 and generally perpendicular to the longitudinal axis 190. The tow-bar 100 is typically made from a sturdy metal to provide strength to the tow-bar 100. The channels 120 remove weight from the tow-bar 100 but are arranged so that the sturdiness of the tow-bar 100 remains intact.

The body 105 further includes a skid plate 140 connected to the underside of the body 105. The skid plate 140 can include a generally curved shape (as seen in further detail in FIG. 5). The skid plate 140 is generally used to take the brunt of the force if the tow bar 100 is dropped during use. The curved shape is a snag-free arc providing an increased wear area as the skid plate 140 contacts rough surfaces when it is dropped and often dragged. Further more, the skid plate 140 typically keeps the head 110 from contacting the ground if the tow bar 100 is dropped. The skid plate 140 is described further below with respect to FIG. 5. The body 105 can also include a bar 145 connected to the underside of the body and generally parallel to the hinging portion 115. The bar 145 is discussed in further detail in the description below. The head piece 110 is connected to one end of the body 105. The head piece 110 typically has a generally includes a base 111, generally perpendicular to the longitudinal axis 190, and an apex 112, the base 111 of the head piece 110 being connected to the body 105. The apex 112 of the head piece 110 typically includes a hole 125 through which the pin on another cart (not shown) can be fit. An angled and elongated protrusion 130 is connected to the head piece 110 adjacent the hole 125. The head piece 110 further includes a plurality of handles 135, having corresponding recesses 137, positioned in a generally triangular arrangement internal to the head piece 110. One of the handles 135 is arranged generally parallel to the base 111 of the head piece 10, which is also generally parallel to the elongated channels 120, and therefore generally perpendicular to the longitudinal axis 190. This parallel handle 135 is internal to the head piece 110. The other two handles 135 are arranged along the angled sides 136 of the head piece 110, and generally angled rearward from the longitudinal axis 190. These side handles 135 are also internal to the head piece 110, typically within the edges of the sides 136. This internal arrangement of the handles 135 provides protection for the handles 135 if the tow-bar 100 is dropped. The triangular arrangement of the handles 135 also provides an ergonomic and natural positioning for a user. The triangular arrangement of the handles 135 thereby provides a variety of ways for the user to take hold of the tow-bar 100 while the user is connecting and disconnecting carts including the tow-bar 100.

The hinging portion 115, which is generally parallel to the longitudinal axis, is connected to the end of the body 105 opposite the end connected to the head piece 110. The hinging portion 115 includes two hinge bars 116, 118 that interconnect with hinge pins connected to the cart (see FIG. 3 below). Holes 117, 119 are included on the hinge bars 116, 119 in order to engage and connect to the hinge pins on the cart. One of the hinge bars 116 has a generally circular end 116a. The other hinge bar 118 is typically longer than the hinge bar 116. The hinge bar 118 further includes a flat side 118a. In general, the longer hinge bar 118 used in conjunction with the flat side 118s allows interaction with the braking system of a ground support vehicle as described in further detail below.

FIG. 2 illustrates a perspective view of constituent pieces of an embodiment of a vehicle tow-bar 100. The tow-bar 100 typically includes, as constituent pieces, the main tongue body 105, the head piece 110 and the hinging portion 115 that includes the bars 116, 118. As described above, the body generally includes the series of elongated channels 120 cut into the body 105, the skid plate 140 connected to the underside of the body 105, which is shown in more detail, illustrating the generally curved shape (as seen better in FIG. 5) and the bar 145 connected to the underside of the body and generally parallel to the hinging portion 115. The head piece 110 typically having the base 111, the apex 112, the elongated protrusion 130 adjacent the hole 125 and the plurality of handles 135 positioned in a generally triangular arrangement internal to the head piece 110 is also shown. The hinging portion 115 that is connected to the end of the body 105 opposite the end connected to the head piece 110 is also shown. The hinging portion 115 includes two hinge bars 116, 118 having the holes 117, 119.

As described above, the body 105 typically includes tapered sides 106. The sides 106 taper from the smallest point 107 of the body 105 to the widest point 108 at the end of the body 105. The tapered sides 106 allow the smooth interconnection of the keyed constituent components, which is now described. The head piece 110 includes a male protrusion 113 having a wide end 113a and a narrow end 113b. The male protrusion 113 interconnects with a female recess 114 located on the body 105 adjacent the smallest point 107 of the body 105. The male protrusion 113 and the female recess 114 together form the key interconnecting the head piece 110 and the body 105.

The bars 116, 118 include male protrusions 116b, 118b having a generally circular shape. The male protrusions 116b, 118b interconnect with corresponding female recesses 109 located on the widest point 108 of the tapered sides 106. The male protrusions 116b, 118b and the female recesses 109 together form the key interconnecting the body 105 and the hinging portion 115.

In general, the nature of the keyed portions between the body 105 and the head piece 110 and the body 105 and the hinging portion 115 creates a strong connection where there are natural stress points during the towing process, which include pulling twisting and bending. The narrow nature of the smallest point 107 of the body 105 allows a flush fit between the head piece 110 and the body 105 without any potential points that can catch on other objects. In contrast, the tapered nature of the sides 106 allow the sides 106 to taper into a widest point 108 to accommodate the female recesses 108, thereby allowing a flush fit between the widest point 108 and the bars 116, 118. The natural stress points, as mentioned above, naturally occur at these keyed locations. The wide to narrow shape of the male protrusion 113 and female recess 114 as well as the circular shape of the male protrusions 116b, 118b and female recesses 109 allow a secure fit of the constituent components, thereby being able to withstand the forces of the towing process. Typically the respective keyed location of the head 110 and body 105 is generally perpendicular to the keyed location of the hinged portion 115 and the body 105. The male protrusions 113, 116b, 118b and respective female recesses 114, 109 are welded to keep them interconnected. It is understood that different shapes of the male protrusions 113, 116b, 118b and female recesses 114, 109 are contemplated.

FIG. 3 illustrates a perspective view of a cart 200 having an embodiment of a vehicle tow-bar 100. The cart 200 can be any variety of ground support vehicles used in conjunction with airlines such as a baggage cart. However, it is understood that the tow bar 100 can be used in conjunction with any type of vehicle or cart requiring a tow bar. The cart typically includes a main body 205 which is shown generically as a flat bed for illustrative purposes. The cart 200 typically further includes wheels 210. The cart 200 further includes a tow bar connection assembly 215 having hinge pins 220 that interconnect with the holes 117, 119 on the hinge bars 116, 118. The cart 200 typically also includes a hitch assembly 225 having a hitch pin 230 that is adapted to fit through the hole on a tow bar on another cart similar to the hole 125 and tow bar 100 as shown in the figure.

The tow-bar 100 typically includes, as constituent pieces, the main tongue body 105, the head piece 10 and the hinging portion 115 that includes the bars 116, 118. The constituent components are keyed as described above. The body 105 generally includes the series of elongated channels 120 cut into the body 105, the skid plate 140 connected to the underside of the body 105 and the bar 145 connected to the underside of the body and generally parallel to the hinging portion 115. The head piece 110 typically having the base 111, the apex 112, the elongated protrusion 130 adjacent the hole 125 and the plurality of handles 135 positioned in a generally triangular arrangement internal to the head piece 110 is also shown. The hinging portion 115 that is connected to the end of the body 105 opposite the end connected to the head piece 110 is also shown. The hinging portion 115 includes two hinge bars 116, 118 having the holes 117, 119.

In typical operation the tow bar 100 can pivot about the hinge pins 220 as needed by the operator who can engage the tow bar 100 using any of the handles 135. The tow bar 100 can be interconnected with a hitch assembly on another cart or on a tractor or other ground support vehicle. The skid plate 140 provides support and protection for the tow bar 100. In general, carts such as cart 200 typically include a braking system as part of the hitch assembly 215 that interacts with the tow bar 100. The braking system typically includes a cable that interconnects with the bar 145. As the tow bar 100 is lifted, the bar 145 pulls the cable which typically engages the braking system. Since the hinge bar 18 is longer than the hinge bar 116, the hinge bar 118 is used as part of the braking system of the cart 200. The flat side 118a on the hinge bar 118 typically engages a brake pedal 250 that is a portion of the braking system to keep the tow bar 100 oriented in an upwards position thereby keeping the braking system engaged. Having the braking system engaged while the tow bar 100 is positioned upward is useful for keeping the cart 200 secured while the cart 200 is not attached to a larger train of carts and other ground support vehicles.

FIG. 4 illustrates a top view of an embodiment of a vehicle tow-bar 100. As described above, the tow-bar 100 typically includes the main tongue body 105, the head piece 110 and the hinging portion 115 that includes the bars 116, 118. The constituent components are keyed as described above. The body 105 generally includes the series of elongated channels 120 cut into the body 105, female recess 114 and the bar 145 connected to the underside of the body and generally parallel to the hinging portion 115. The head piece 110 typically having the base 11, the apex 112, the elongated protrusion 130 adjacent the hole 125 and the plurality of handles 135 positioned in a generally triangular arrangement internal to the head piece 110, as well as male protrusion 113, is also shown. The hinging portion 115 that is connected to the end of the body 105 opposite the end connected to the head piece 110 is also shown.

FIG. 5 illustrates a side view of an embodiment of a vehicle tow-bar 100. The constituent components of the tow-bar 100 include the main tongue body 105, the head piece 110 and the hinging portion 115 that includes the bars 116, 118. The body 105 generally includes the tapered sides 106, the skid plate 140 connected to the underside of the body and the bar 145 connected to the underside of the body and generally parallel to the hinging portion 115. The skid plate 140 includes one or more holes 141, which typically serve to remove weight from the skid plate 140. As described above, the curved arc of the skid plate provides a larger surface area for wear as the tow bar 100 is dropped and dragged in normal use. The bar 145 includes a hole 146 for interconnection with a cable as part of a braking system for a cart 200 as described above with respect to FIG. 3. The head piece 110 typically having the base 111, the apex 112, the elongated protrusion 130 and the plurality of handles 135 is also shown. The hinging portion 115 that is connected to the end of the body 105 opposite the end connected to the head piece 110 is also shown. The hinge bar 118 having flat side 118a, circular male protrusion 118b and hole 119 is shown.

FIG. 6 illustrates a bottom view of an embodiment of a vehicle tow-bar 100. The tow-bar 100 typically includes the main tongue body 105, the head piece 110 and the hinging portion 115 that includes the bars 116, 118. The constituent components are keyed as described above. The body 105 generally includes the series of elongated channels 120 cut into the body 105, the skid plate 140 connected to the underside of the body 105 and the bar 145 connected to the underside of the body and generally parallel to the hinging portion 115. This underside view further illustrates flattened surfaces 150 to which the skid plate and the bar 145 connect. Further recesses 160 are cut into the flattened surfaces 150 in order to skeletonize and thereby decrease overall weight of the tow bar 100 as described above. The head piece 110 typically having the base 111, the apex 112, the hole 125 and the plurality of handles 135 positioned in a generally triangular arrangement internal to the head piece 110 is also shown. The hinging portion 115 that is connected to the end of the body 105 opposite the end connected to the head piece 110 is also shown.

The foregoing is considered as illustrative only of the principles of the invention. Further, various modifications may be made of the invention without departing from the scope thereof and it is desired, therefore, that only such limitations shall be placed thereon as are imposed by the prior art and which are set forth in the appended claims.

What is claimed is:

1. A vehicle tow-bar apparatus, comprising:
a main body having an underside, a first end, a second end and a longitudinal axis;
a head piece connected to the first end of the body;
a hinging portion connected to the second end of the body;
a first hinge bar connected to the main body and generally parallel to the longitudinal axis; and
a second hinge bar connected to the main body and generally parallel to the longitudinal axis and to the first hinge bar wherein the first and second hinge bars include hinge holes; and
a male protrusion on each of the first and second hinge bars that interconnect with a respective female recess located in tapered side walls of the main body.

2. The apparatus as claimed in claim 1 further comprising a plurality of elongated channels located in the main body, the channels being generally perpendicular to the longitudinal axis.

3. The apparatus as claimed in claim 1 further comprising:
a skid plate having an arc-shape, connected generally perpendicular to the underside of the body and adjacent the first end; and
a bar connected to the underside of the body generally parallel to the longitudinal axis and the hinging portion.

4. The apparatus as claimed in claim 1, wherein the head piece further comprises a base having a male protrusion that interconnects with a corresponding female recess located in the first end of the main body.

5. The apparatus as claimed in claim 4 wherein the male protrusions on the hinge bars are generally perpendicular with respect to the male protrusion on the head piece.

6. The apparatus as claimed in claim 1 further comprising a plurality of handles in a generally triangular arrangement, the handles being located within outer edges of the head piece.

7. The apparatus as claimed in claim 6 wherein one of the plurality of handles is generally perpendicular to the longitudinal axis and at least one of the remaining plurality of handles is angled rearward with respect to the longitudinal axis.

8. A vehicle system, comprising:
a vehicle;
a vehicle tow-bar apparatus connected to the vehicle, the apparatus comprising:
a main body having tapered sides, an underside, a first end, a second end and a longitudinal axis;
a head piece having a plurality of handles positioned in a generally triangular arrangement within outer edges of the head piece, the head piece being connected to the first end of the body;
a hinging portion connected to the second end of the body, wherein the head piece and the hinging portion are keyed to the main body;
a first hinge bar connected to the main body and generally parallel to the longitudinal axis; and
a second hinge bar connected to the main body and generally parallel to the longitudinal axis and to the first hinge bar, wherein the first and second hinge bars include hinge holes; and
a male protrusion on each of the first and second hinge bars that interconnect with a respective female recess located in tapered side walls of the main body.

9. The system as claimed in claim 8 further comprising a skid plate having a generally curved shape and being connected to the underside of the main body.

10. The system as claimed in claim 8 wherein the main body is skeletonized.

11. The system as claimed in claim 8 wherein the vehicle tow-bar apparatus is connected to the vehicle through a connection assembly.

12. The system as claimed in claim 8 wherein the vehicle is an aircraft ground support vehicle.

13. An aircraft ground support tow bar apparatus, comprising:
a skeletonized main body having an underside, tapered side walls in a generally parallel orientation and connected to the underside, a first end, a second end, a skid plate connected to the underside and a bar connected to the underside and generally parallel to the main body, the bar being adapted to connect to a connection assembly of a vehicle;
a head piece keyed to the main body and having an internally arranged plurality of handles; and
a hinging portion having a first and a second hinge bar, the bars being keyed to and generally parallel to the main body.

14. The apparatus as claimed in claim 13 wherein the head piece is keyed to the main body through a male protrusion on the head piece being engaged with a female recess located in the first end of the main body.

15. The apparatus as claimed in claim 14 wherein the hinge bars are keyed to the main body through a male protrusion on each of the hinge bars being engaged with a respective female recess on the tapered sides of the main body.

16. The apparatus as claimed in claim 13 wherein the tapered sides taper from a narrow point adjacent the first end of the main body to a wide end having female recesses adjacent the second end of the main body.

17. The apparatus as claimed in claim 16 further comprising a female recess in the first end of the main body, the recess being oriented generally perpendicular to the female recesses adjacent the second end of the main body.

* * * * *